United States Patent [19]

Siegel

[11] 4,341,033
[45] Jul. 27, 1982

[54] RELEASING AND RESETTING MECHANISM FOR USE IN A RAT TRAP

[76] Inventor: David B. Siegel, 3450 Sawtelle Blvd., Apartment 212, Los Angeles, Calif. 90066

[21] Appl. No.: 199,111

[22] Filed: Jan. 19, 1980

[51] Int. Cl.³ ............................................ A01M 23/30
[52] U.S. Cl. ........................................... 43/81; 43/83
[58] Field of Search ...................................... 43/81, 83

[56] References Cited

U.S. PATENT DOCUMENTS

| | | | |
|---|---|---|---|
| 1,712,893 | 5/1929 | McDougal | 43/81 |
| 2,257,246 | 9/1941 | Rudolph | 43/81 |
| 3,992,803 | 11/1976 | Kaiser | 43/83 |
| 4,216,606 | 8/1980 | Kaiser | 43/83 |

FOREIGN PATENT DOCUMENTS 179305  5/1922  United Kingdom ................... 43/81

*Primary Examiner*—Nicholas P. Godici
*Attorney, Agent, or Firm*—W. Edward Johansen

[57] ABSTRACT

The present invention is an improved releasing and resetting mechanism for use in a rat trap which includes a rectangular shell having a top, a bottom, a pair of sides, a back and an entrance opening. The releasing and resetting mechanism includes a trapping mechanism which is pivotally attached to the top of the rectangular shell and disposed within the rectangular shell so that it is parallel to the top of the rectangular shell when the trapping mechanism is in its set position and so that the trapping mechanism contacts the bottom of the rectangular shell when it has been triggered. The releasing and resetting mechanism also includes a spring which is biased between the trapping mechanism and the top of the rectangular shell downwardly biasing the trapping mechanism toward the bottom of the rectangular shell and a plastic band with a plurality of parallelly disposed teeth which is mechanically coupled to the trapping means. The releasing and resetting mechanism further includes a securing mechanism for securing the plastic band so that the plastic band holds the trapping mechanism in its set position and a trigger mechanism for triggering the securing mechanism so that the securing mechanism releases the trapping mechanism. The securing mechanism includes a flat rectangular member which is disposed on the top of the rectangular shell outside thereof and which is resiliently biased so that one of the ends of the flat rectangular member engages the plurality of teeth of the plastic band to hold it in place.

3 Claims, 6 Drawing Figures

U.S. Patent   Jul. 27, 1982   4,341,033
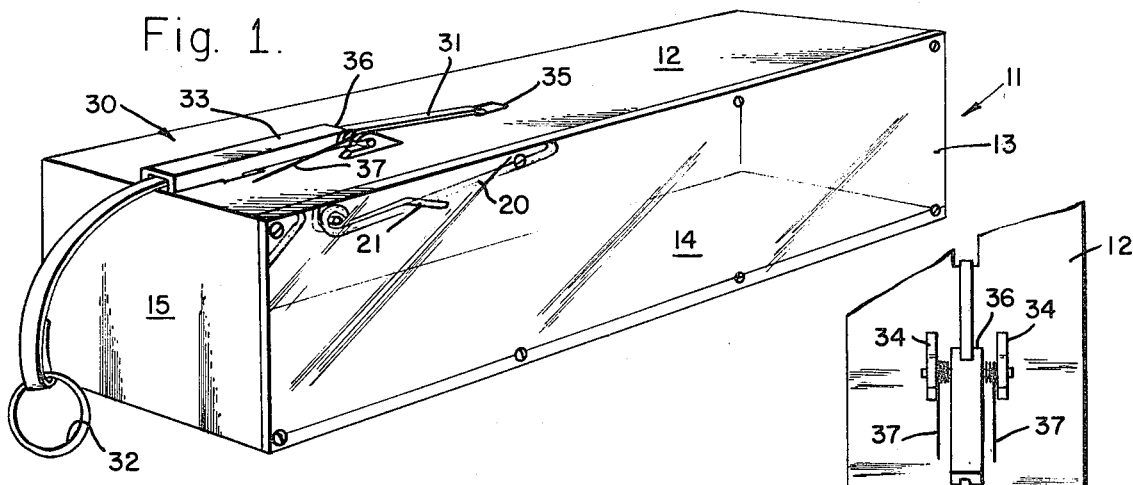
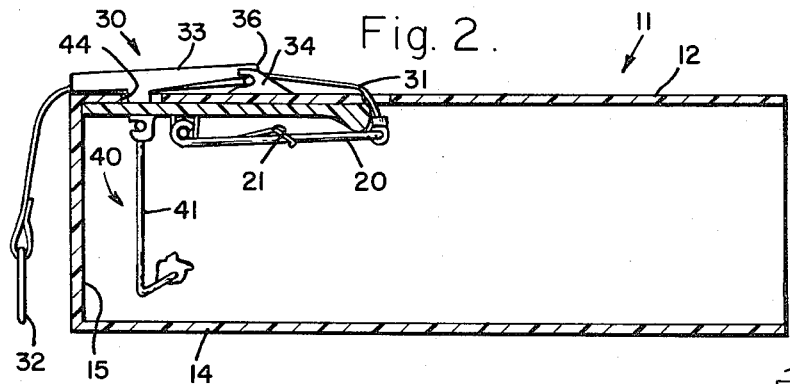
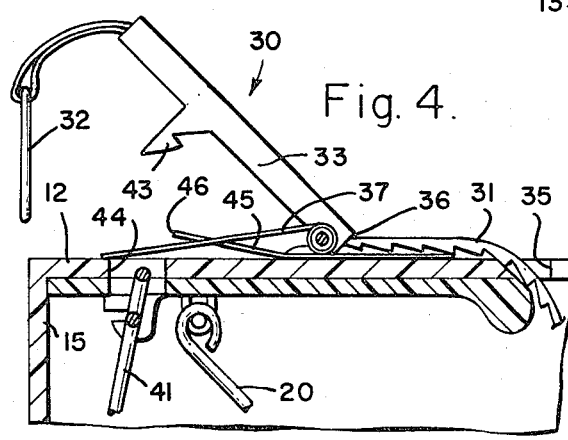
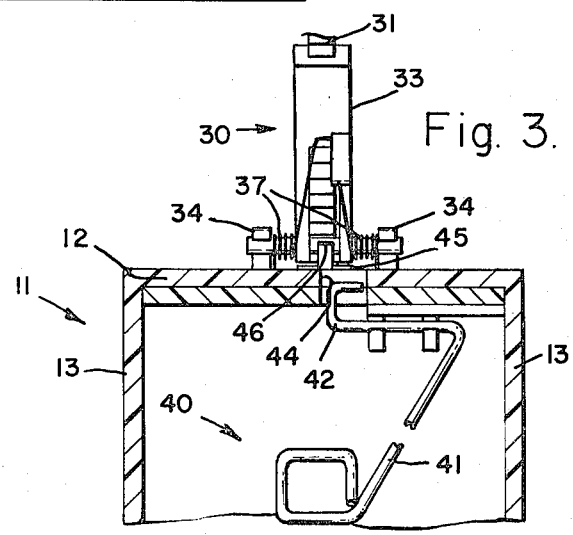
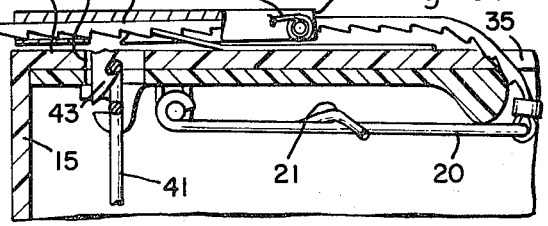

RELEASING AND RESETTING MECHANISM FOR USE IN A RAT TRAP

BACKGROUND OF THE INVENTION

1. Field of the Invention

The present invention relates to an animal trap which will hold and encase an animal such as a rat and more particularly an animal trap which may be easily reset as an individual is disposing of the trapped animal.

2. Description of the Prior Art

U.S. Pat. No. 4,158,929, entitled Animal Trap Device, issued to Paul Custard on June 26, 1979, teaches an invention which relates to animal traps and in particular single jaw traps which will prevent the caught animal from self injury to its leg. There have been many varieties of animal traps. The most common spring-type traps, upon being tripped, will clutch the animal's paw in a strong vice-like grip having the full force of the spring behind it. This type of trap often injures the animal's leg and it causes extreme pain to the trapped beast. Very frequently the trapped animal will gnaw off its own leg in an effort to free itself from the trap, thus resulting in a maimed animal and an inhumane trapping device.

The animal trap includes a tubular shell having an entrance opening therein and a trapping mechanism which is pivotally attached to the upper portion of the tubular shell and when in contact with the lower portion of the tubular shell is at an inwardly disposed acute angle from the entrance opening. The trapping mechanism pivots inwardly from the entrance opening in order to form a trap which engages the animal leg. The animal trap also includes a spring which is biased between the trapping mechanism and the tubular shell thereby pivoting the trapping mechanism outwardly toward the entrance opening of the tubular shell and an inwardly pivoting trigger which is attached to the tubular shell and which rotates inwardly from the entrance opening of the tubular shell. The animal trap further includes a trigger catch which is attached to the trigger and which is engagable with the trapping mechanism. The tubular shell may be secured to a wall so that the trapped animal can not drag the animal trap away.

U.S. Pat. No. 4,173,092, entitled Rat Capturing Device, issued to Tadanobu Nakai on Nov. 6, 1979, teaches an animal trap which includes an elongated hollow box-like housing having first and second side walls, a bottom wall and an end wall and an open end portion, a movable closure and a pivot shaft which extends between the first and second side walls and which supports the movable closure for pivotal movement about an upper portion of the movable closure so that the movable closure is movable between a closed position blocking the open end portion of the housing and an open position to permit the passage of a rat into the interior of the housing. The animal trap also includes a latch mechanism which is mounted in the housing for movement between an unlatching position which permits opening of the movable closure and a latching position which prevents movement of the movable closure from its closed position. The latch mechanism includes a latch shaft which extends across the interior of the housing between the first and second side walls inwardly of the movable closure and a latch actuator mechanism which supports the latch mechanism for movement from its unlatching position to its latched position in response to movement of the movable closure from its closed position to its open position followed by movement of the movable closure to its closed position. The latch actuator includes first and second aligned wall slots which are provided, respectively, in the first and second side walls with the respective ends of the latch shaft being mounted in the respective wall slots so that they move therealong with each of the wall slots each of which is a main vertically extending canted slot portion having a lower end termination and an upper end termination with the upper end termination being spaced inwardly of the housing from the movable closure a greater distance than the lower end termination of the main vertically extending slot portion. Each of the wall slots also includes upper and lower slot portion, respectively, which are connected to the upper and lower ends of the main vertically extending slot portions and which extend forwardly and rearwardly at a canted angle with respect to the main vertically extending slot portions.

U.S. Pat. No. 4,179,835, entitled Small Animal Trap, issued to Robert F. Hunter on Dec. 25, 1979, teaches a small animal trap which has a cage with a bottom, a top, an open front end and sides joining the top, bottom and back and which includes a trap door hingedly affixed to the top of the cage at the front thereof. The trap door has a bottom edge. The small animal trap also includes a support member which extends beyond the back of the cage substantially coplanarly with the bottom thereof and a first pair of spaced parallel posts which extend substantially perpendicularly from the support member at a predetermined distance from the back of the cage and at a predetermined distance from each other. The small animal trap further includes a second pair of spaced parallel posts which extend substantially perpendicularly from the support member at a greater distance from the back of the cage than the predetermined distance and which have a cross bar which is affixed thereto and which extends therebetween substantially parallel to the support member and spaced thereabove. The small animal trap still further includes a lever which is pivotally mounted in the back of the cage at the center of the lever and which is balanced therein with the lever having a first end in the cage with a tray thereon for bait and a spaced opposite end which is movably positioned between the first pair of posts, a trip rod which has a length longer than the predetermined distance between the first pair of posts and which rests on the lever between the first pair of post and the cage, and a cord which has a first end affixed to the front bottom edge of the trap door and a spaced opposite second end affixed to the center of the trip rod. The cord is guided along the top of the cage and around the cross bar in a manner whereby the trap door is held open and when an animal depresses the first end of the lever by taking the bait, the second end of the lever moves upward and knock the trip rod free thereby slackening the cord so that the trap door is released and closed.

None of the above patents teaches a rat trap which not only traps and kills a rat, but which also enables an individual to reset the rat trap as he is disposing of the rat. Furthermore all of the above patents teach relatively complicated mechanical animal traps which are difficult to manufacture and assemble.

SUMMARY OF THE INVENTION

In view of the foregoing factors and conditions characteristic of the prior art it is the primary object of the present invention to provide a releasing and resetting mechanism for use with a rat trap which not only traps and kills a rat, but which also enables an individual to reset the rat trap as he is disposing of the rat.

It is another object of the present invention to provide a releasing and resetting mechanism for use with a rat trap which is inexpensive to fabricate and which is not mechanically complicated.

In accordance with an embodiment of the present invention an improved releasing and resetting mechanism for use in a rat trap is described. The releasing and resetting mechanism includes a rectangular shell having a top, a bottom, a pair of sides, a back and an entrance opening. The releasing and resetting mechanism includes a trapping mechanism which is pivotally attached to the top of the rectangular shell and disposed attached to the top of the rectangular shell and disposed within the rectangular shell so that it is parallel to the top of the rectangular shell when the trapping mechanism is in its set position and so that the trapping mechanism contacts the bottom of the rectangular shell when it has been triggered. The releasing and resetting mechanism also includes a spring which is biased between the trapping mechanism and the top of the rectangular shell downwardly biasing the trapping mechanism toward the bottom of the rectangular shell and a plastic band with a plurality of parallelly disposed teeth which is mechanically coupled to the trapping means. The releasing and resetting mechanism further includes a securing mechanism for securing the plastic band so that the plastic band holds the trapping mechanism in its set position and a trigger mechanism for triggering the securing mechanism so that the securing mechanism releases the trapping mechanism. The securing mechanism includes a flat rectangular member which is disposed on the top of the rectangular shell outside thereof and which is resiliently biased so that one of the ends of the flat rectangular member engages the plurality of teeth of the plastic band to hold it in place. Objects believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective view of a rat trap which includes an improved releasing and resetting mechanism which has been constructed in accordance with the principles of the present invention.

FIG. 2 is a side elevational cross-sectional view of the rat trap of FIG. 1.

FIG. 2a is a partial top plan view of the improved releasing and resetting mechanism of the rat trap of FIG. 1.

FIG. 3 is a partial front elevational cross-sectional view of the rat trap of FIG. 1.

FIG. 4 is a partial side elevational cross-sectional view of the improved releasing and resetting mechanism of the rat trap of FIG. 1 in its released position.

FIG. 5 is a partial side elevational cross-sectional view of the improved releasing and resetting mechanism of the rat trap of FIG. 1 in its set position.

DESCRIPTION OF THE PREFERRED EMBODIMENT

In order to best understand the present invention it is necessary to refer to the following description of its preferred embodiment in conjunction with the accompanying drawing. Referring to FIG. 1 a rat trap 10 includes a rectangular shell 11 having a top 12, a pair of sides 13, a bottom 14, a back 15 and an entrance opening 16. The rat trap 10 also includes a trapping mechanism 20 which is pivotally attached to the top 12 of the rectangular shell 11 therewithin and which is disposed so that the trapping mechanism 20 is parallel to the top 12 of the rectangular shell 11 when it is in its set position and so that the trapping mechanism 20 contacts the bottom 14 of the rectangular shell 11 when it has been triggered. The rat trap 10 further includes a spring 21 which is biased between the trapping mechanism 20 and the top 12 of the rectangular shell 11 biasing the trapping mechanism 20 downwardly toward the bottom 14 of the rectangular shell 11 and an improved releasing and resetting mechanism 30 which is mechanically coupled to the trapping mechanism 20 in order to release and reset it.

Referring to FIG. 2 in conjunction with FIG. 1 the releasing and resetting mechanism 30 includes a plastic band 31 with a plurality of parallelly disposed teeth which is mechanically coupled to the trapping mechanism 20 at one end and which has a ring 32 at the other end. The releasing and resetting mechanism 30 also includes a securing mechanism 33 which is an L-shaped member and which is pivotally coupled to a mounting member 34 on the top 12 of the rectangular shell 11. The securing mechanism 33 secures the plastic band 31 so that it holds the trapping mechanism 20 in its set position. The plastic band 31, which is attached at one end to the trapping mechanism 20, is threaded through a slot 35 in the top 12 of the rectangular shell 11 and is also threaded through a slot 36 in the securing mechanism 33. The securing mechanism 33 is resiliently biased by a spring 37, which is more clearly shown in FIG. 2a than in FIG. 1.

Referring now to FIG. 3 in conjunction with FIG. 2 and FIG. 4 the releasing and resetting mechanism 30 further includes a triggering mechanism 40 which includes an integral member 41 having a first end which is pivotally coupled to the top 12 of the rectangular shell 11 and which is disposed adjacent to the spring 21 and a second end to which the bait is attached. The triggering mechanism 40 also includes a latch 42 which is mechanically coupled to the integral member 41 adjacent to its first end. The securing mechanism 33 also has a hook 43 which is engaged by the latch 42 through a hole 44 in the top 12 of the rectangular shell 11 so that the latch 42 holds the securing mechanism 33 in its set position.

Referring now to FIG. 5 in conjunction with FIG. 4 the securing mechanism 33 also includes a flat rectangular member 45 with a first end 46 which is resiliently biased so the first end 46 of the flat rectangular member 45 engages one of the plurality of teeth of the plastic band 31 when the securing mechanism 33 is in its set position. In order to reset the rat trap 10 one pulls the plastic band 31 by the ring 32 through the slot 35 in the top 12 of the rectangular shell 11 and the slot 36 in the securing mechanism 33 so that the trapping mechanism 20 is pulled by the plastic band 31 into its set position. The securing mechanism 33 is held in place by the latch 42 which engages the hook 43 of the securing mechanism 33 and secures the plastic band 31 against the first end 46 of the flat rectangular member 45. When the second end of the integral member 41 of the triggering mechanism 40 is touched by a rat the latch 42 disengages the hook 43 of the securing mechanism 33 and the spring 37 resiliently moves the securing mechanism 33 away from the flat rectangular member 45 thereby releasing the plastic band 31 and capturing the rat. When the rat has been trapped and killed by the rat trap 10 the rat may be disposed of by pulling on the ring 32 thereby releasing the rat and resetting the rat trap 10.

From the foregoing it can be seen that an improved releasing and resetting mechanism for a rat trap has been described. The rat trap may be constructed virtually of plastic materials aside from the springs and the trapping mechanism. One of the advantages of the improved releasing and resetting mechanism for a rat trap is that the rat may be released and the rat trap reset in the same motion.

Accordingly it is intended that the foregoing disclosure and showing made in the drawing shall be considered only as illustrations of the present invention. Furthermore it should be noted that the sketches are not drawn to scale and that distance of and between the figures are not to be considered significant. The present invention will be set forth with particularity in the appended claims.

What is claimed is:

1. An improved releasing and resetting mechanism for use in a rat trap which includes a rectangular shell having an entrance opening, a top, a bottom, a pair of sides and a back, said improved releasing and resetting mechanism comprising:
   a. trapping means pivotally attached to the top of the rectangular shell within the rectangular shell and which is disposed so that said trapping means is parallel to the top of the rectangular shell when said trapping means is in its set position and so that when said trapping means has been triggered said trapping means contacts the bottom of the rectangular shell;
   b. a spring which is biased between said trapping means and the top of the rectangular shell downwardly biasing said trapping means toward the bottom of the rectangular shell;
   c. a plastic band which has a plurality of parallelly disposed teeth, said plastic band being mechanically coupled to said trapping means;
   d. securing means for securing said plastic band so that said plastic band holds said trapping means in its set position;
   e. an integral member having a first end which is pivotally coupled to the top of the rectangular shell and which is disposed adjacent to said spring and a second end to which the bait is attached; and
   f. a latch which is mechanically coupled to said integral member adjacent to the first end of said integral member, said latch restrains said securing means so that said plastic band holds said trapping means in its set position whereby said improved releasing and resetting mechanism is triggered when said integral member pivots about the first end of said integral member as the bait is touched by a rat which causes said latch to release said securing means thereby releasing said plastic band.

2. An improved releasing and resetting mechanism for use in a rat trap according to claim 1 wherein said securing means comprises:
   a. a flat rectangular member with a first end and a second end which is mechanically coupled to the top of the rectangular shell and which is resiliently biased so that the first end of said flat rectangular member engages one of the plurality of teeth of said plastic band; and
   b. holding means for holding said plastic band so that said plastic band maintains the first end of said flat rectangular member in engagement with one of the plurality of teeth of said plastic band when said holding means is mechanically coupled to said latch.

3. An improved releasing and resetting mechanism for use in a rat trap according to claim 2 wherein said holding means comprises:
   a. an L-shaped member having a first end which is pivotally coupled to the top of the rectangular shell outside of the rectangular shell and a second end which has a hook which is engaged by said latch, said hook being mechanically coupled to said latch through a first hole in the top of the rectangular shell whereby said plastic band which is mechanically coupled to said trapping means through a second hole in the top of the rectangular shell is threaded through a hole in the first end of said L-shaped member so that one of the plurality of teeth of said plastic member engages the first end of said flat rectangular member and is held in place by said L-shaped member.

* * * * *